(12) United States Patent
Mistry et al.

(10) Patent No.: US 8,745,016 B2
(45) Date of Patent: Jun. 3, 2014

(54) MANAGING CONCURRENT ACCESS TO DATA IN DATABASE SYSTEM

(75) Inventors: Harjindersingh G. Mistry, Bangalore (IN); Mayank Prasad, Chandigarh (IN); Neeraj S Sharma, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/163,000

(22) Filed: Jun. 17, 2011

(65) Prior Publication Data

US 2012/0323873 A1 Dec. 20, 2012

(51) Int. Cl.
*G06F 17/30* (2006.01)
(52) U.S. Cl.
USPC ........................................... 707/704
(58) Field of Classification Search
CPC .................. G06F 17/30362; G06F 17/30171; G06F 17/30952
USPC .......................... 707/704, 999.008
See application file for complete search history.

(56) References Cited

U.S. PATENT DOCUMENTS

| | | | | |
|---|---|---|---|---|
| 4,685,088 A * | 8/1987 | Iannucci | ................ | 365/189.02 |
| 5,721,943 A * | 2/1998 | Johnson | ................ | 713/300 |
| 5,832,484 A * | 11/1998 | Sankaran et al. | ................ | 1/1 |
| 6,240,413 B1 | 5/2001 | Learmont | | |
| 6,253,274 B1 * | 6/2001 | Boonie et al. | ................ | 710/200 |
| 6,556,994 B1 * | 4/2003 | Zheng et al. | ................ | 1/1 |
| 6,606,626 B1 * | 8/2003 | Ponnekanti | ................ | 1/1 |
| 6,772,155 B1 | 8/2004 | Stegelmann | | |
| 6,963,872 B2 | 11/2005 | Whang | | |
| 6,973,467 B1 * | 12/2005 | Furusho | ................ | 707/700 |
| 7,461,065 B2 | 12/2008 | Rajakumar | | |
| 7,844,584 B1 * | 11/2010 | Griess | ................ | 707/704 |
| 8,214,362 B1 * | 7/2012 | Djabarov | ................ | 707/736 |
| 2007/0043751 A1 * | 2/2007 | Chen et al. | ................ | 707/101 |
| 2007/0276833 A1 * | 11/2007 | Sen et al. | ................ | 707/8 |
| 2007/0283357 A1 * | 12/2007 | Jeter et al. | ................ | 718/102 |
| 2007/0299814 A1 | 12/2007 | Barsness | | |
| 2008/0010283 A1 | 1/2008 | Cornwell | | |
| 2008/0294648 A1 * | 11/2008 | Lin et al. | ................ | 707/10 |

OTHER PUBLICATIONS

Maabreh, K.S., Increasing Database Concurrency Control Based on Attribute Level Locking, , 2008 International Conference on Electronic Design, ICED 2008, 4 pp., 2008, IEEE, Piscataway, NJ, USA.
Chang, et al., Bigtable: A Distributed Storage System for Structured Data, 7th USENIX Symposium on Operating Systems Design and Implementation (2006); http://www.usenix.org/event/osdi06/.

* cited by examiner

*Primary Examiner* — Leslie Wong
(74) *Attorney, Agent, or Firm* — Mohammed Kashef; SVL IP Law

(57) ABSTRACT

A method for managing access to data in a database system includes receiving requests to update data stored in one or more fields of a record in a database table. The method further identifies lock information of the one or more fields from a look-up table associated with the record. The look-up table associated with the record includes lock information of each field of the record. The method then handles the requests based on the identified lock information of the one or more fields.

18 Claims, 5 Drawing Sheets

MANAGING CONCURRENT ACCESS TO DATA IN DATABASE SYSTEM

FIELD OF THE INVENTION

Embodiments of the present invention relates to managing concurrent access to data in a database management system.

BACKGROUND

In a multi-user environment, Relational Data Base Management System (RDBMS) efficiently manages and executes concurrent user queries. The user queries are performed in separate threads of execution and are framed to access data entities associated with the RDBMS, hereinafter referred as database system. In the database system, a single data-entity, for example a database, a table, a row, a cell, and the like, is shared and accessed by multiple threads, which brings the issues of concurrency and data consistency. In an example, the row is a record of the database table.

Presently, for concurrency and data consistency, a mechanism of locking is used in the database system that enforces mutually exclusive access to shared data entities. As a result, only one thread can access a shared data entity at a time. However, this mechanism degrades the database system performance depending upon lock's granularity. For example, a row-lock is more granular than a table-lock. Thus, when a column (or a field) in a row (or a record) is being accessed, then all the other columns corresponding to that row are locked and no update operations can be performed on the other columns.

The database system maintains a global list of locks where each lock entry contains information about a thread that has acquired the lock and information about the shared object being locked. Therefore, if a thread wants to access a shared data object, it will first request a lock from the database system. The database system will then scan through the global lock-list, and check whether the same shared object has been locked by any other thread or not. If the object is not locked, then the database system adds a new entry into lock-list referring to the new thread's exclusive access to the data object. Thus, the thread is allowed to access and modify the contents of the shared object.

After accessing the data object, the thread can request the database system to release the lock that, in turn, deletes the earlier-added entry. The shared data object is then unlocked and is free for access by other threads. Thus, the task of maintaining lock consumes considerable amount of memory and CPU resources. Further, it becomes memory and CPU intensive when large number of data objects is being locked.

Currently, the row level lock is the most granular lock offered by the current implementations of locking mechanism. Therefore, to increase the performance, the row-level locking enables a table scan that allows only read operations on the locked columns of the row, provided that the read operation does not involve the columns being modified by a writer thread. Thus, in a database table, when a transaction intends to perform an update query on a column of the row, the locking mechanism locks the complete row while the update operation is being performed on the column. Hence, other transactions can only perform read operations on the unlocked columns of the row, and cannot update the column. This degrades the performance of the database system.

BRIEF SUMMARY

According to one embodiment of the present invention, a method for managing access to data in a database system is provided. The method includes receiving requests to update data stored in one or more fields of a record in a database table. The method further identifies lock information of the one or more fields from a look-up table associated with the record. The look-up table associated with the record includes lock information of each field of the record. The method then handles the requests based on the identified lock information of the one or more fields.

According to another embodiment of the present invention, a system for managing access to data in a database system is provided. The system includes at least one processor. The processor is adapted to receive requests to update data stored in one or more fields of a record in a database table. The processor is further adapted identify lock information of the one or more fields from a look-up table associated with the record. The look-up table associated with the record includes lock information of each field of the record. The processor then handles the requests based on the identified lock information of the one or more fields.

According to yet another embodiment of the present invention, computer program product for managing access to data in a database system is provided. The computer program product includes receiving requests to update data stored in one or more fields of a record in a database table. The computer program product further identifies lock information of the one or more fields from a look-up table associated with the record. The look-up table associated with the record includes lock information of each field of the record. The computer program product then handles the requests based on the identified lock information of the one or more fields.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
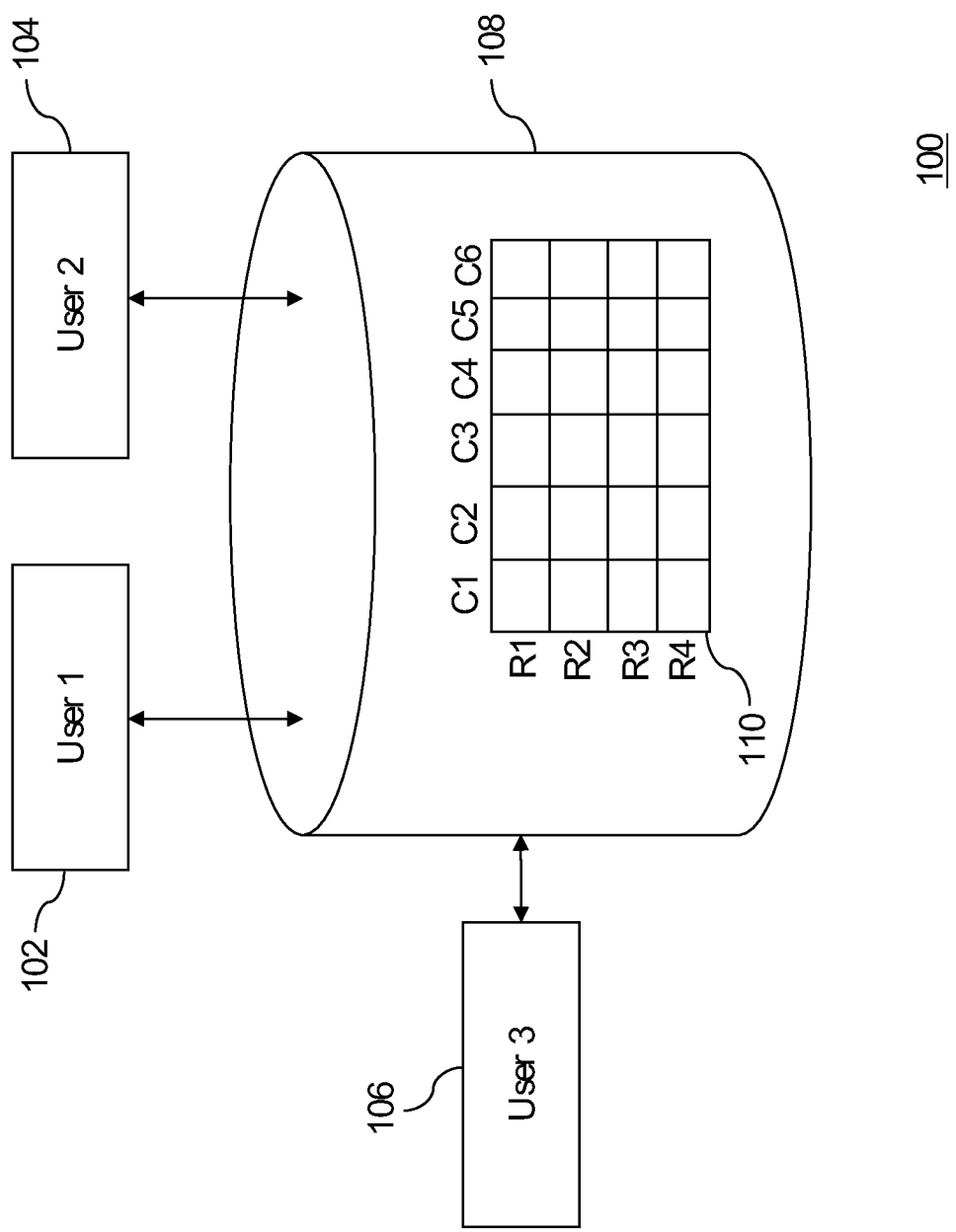
FIG. 1 illustrates an exemplary block diagram of a multi user database system, in accordance with an embodiment of the invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Further, terms such as "first", "second", etc., are used to differentiate between objects having the same terminology and are nowhere intended to represent a chronological order, except where stated otherwise. A set is defined as a non-empty set including at least one element.

FIG. 1 illustrates an exemplary block diagram of a multi user database system, in accordance with an embodiment of the invention.

Referring to FIG. 1, an environment 100 includes a database system in a multi-user environment. The environment 100 includes a plurality of users, for example a user 102, a user 104, and a user 106. The plurality of users is associated with a database 108 that includes a database table 110.

The database table 110 includes plurality of records and a plurality of fields. In the environment 100, the users 102, 104, and 106, can concurrently access and update the database table 110 based on lock entry information associated with the database table 110. In an embodiment, the concurrent access includes accessing the data at the same time. In another embodiment, the concurrent access includes subsequently accessing the data within a predefined time interval and not at the same time. The predefined time interval includes the time during which one or more requests are being already handled and other requests are received that is overlapping at the same time.

The lock entry information includes information associated with the locks, for example information associated with lock-type, lock-mode, lock-duration, and the like. In an embodiment, the lock entry information also includes field lock information of each field associated with each record. The users 102, 104 and 106 are allowed to access multiple fields of the same record based on the field lock information associated with each record. In an embodiment, the fields lock information of each field of a record is included in a look-up table associated with the record. In the embodiment, each record of the database table 110 is associated with a look-up table representing lock information of each field of the record.

Thus, the users 102, 104, and 106 can concurrently update multiple fields associated with a single record based on the field lock information. This is explained in detail in conjunction with FIG. 2. For the sake of clarity and for the purpose of this description, the concurrent update on the fields of a record is explained with reference to a following example. The example is solely for the purpose of understanding and nowhere limits the scope of the invention to the following example.

In the example, it is assumed that all the fields corresponding to each record are initially unlocked. This information is included in field lock information stored in the look-up table. In the example, multiple requests are received from the users 102, 104 and 106 to concurrently update fields corresponding to a record R1. For example, a first request is received from the user 102 to update data stored in a field C1 using data stored in the field C3. Similarly, a second request is received from the user 104 to update data stored in the field C4 using data stored in the field C2 Likewise, a third request is received from the user 106 to update the data stored in the field C1 using the data stored in the field C5.

In an embodiment, the multiple requests are received at the same time. In another embodiment, the multiple requests are received subsequently at different occurrences of time but in an overlapping time period. For example, when a first request is being processed, another request is received, similarly when a first and second request are being processed, a third request is received, and the like.

For handling the first request, the lock information of the fields C1 and C3 is determined using the field lock information stored in a look-up table associated with the record R1. The access to the fields C1 and C3 is then granted to the user 102 as the fields C1 and C3 are unlocked in the look-up table. Thus in the example, a permission to update the data stored in the field C1 based on the data stored in the field C3 is granted to the user 102. Further, the field lock information corresponding to the fields C1 and C3 is then updated in the lookup table and is marked as locked until the update is performed. However, after the update request is completed, the field lock information is again updated by releasing the lock and modifying the field lock information as unlocked in the look-up table.

The second request is similarly handled by determining field lock information of the fields C2 and C4. As the fields C2 and C4 are unlocked in the lookup table, the method allows the user 104 to update the data included in the field C4 using the data in the field C2. Thereafter, the lock information of the field C2 is updated and marked as locked in the look-up table.

Similarly, the third request is handled by determining the field lock information of the fields C1 and C5 from the look-up table. However, the third request will not be allowed to update field C1 as the field C1 is being updated by the user 102. Hence, the field C1 will be updated by the user 106 when the update operation performed by the user 102 is completed and the field lock information corresponding to the field C1 is updated as unlocked in the look-up table.

Figure 2:
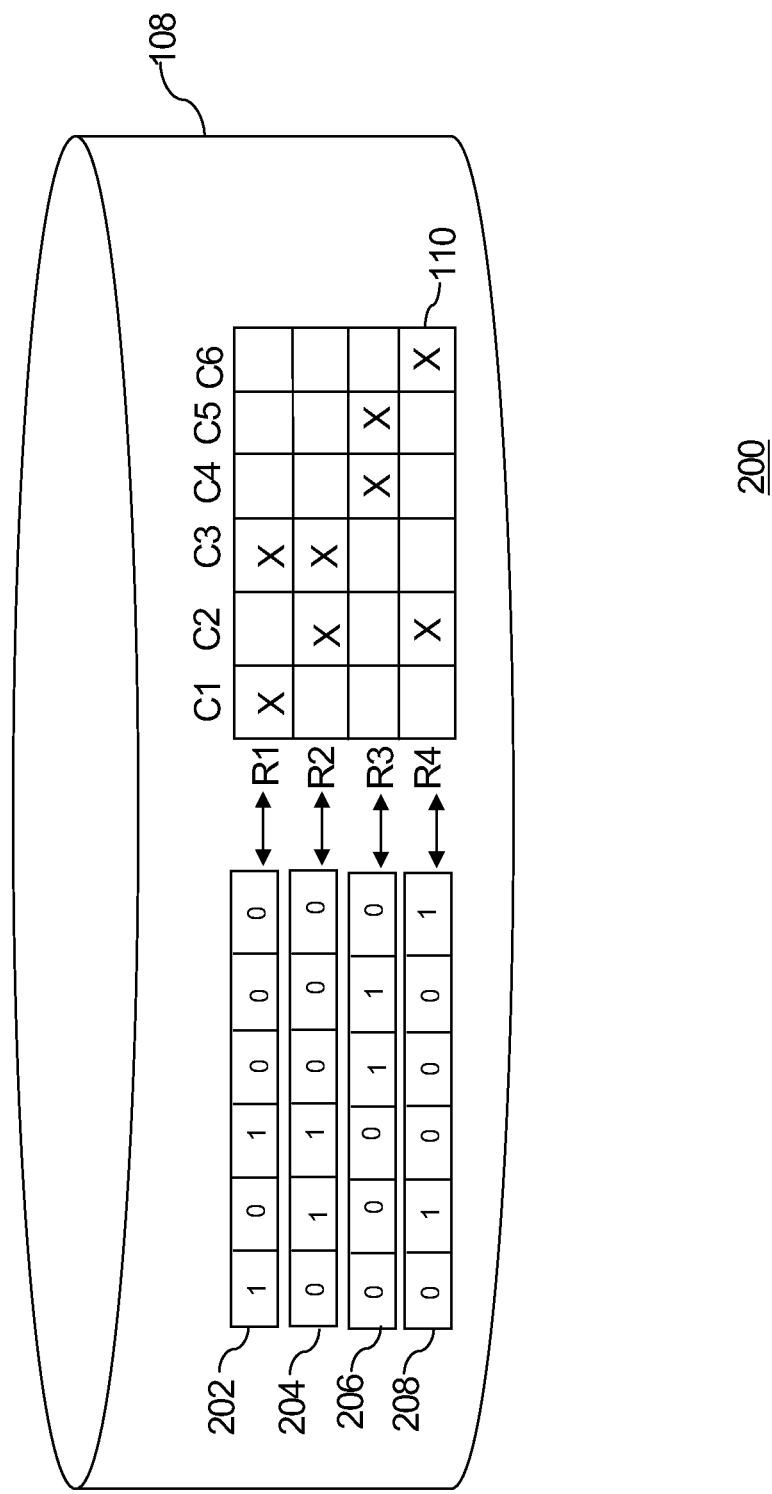
FIG. 2 illustrates an exemplary representation of bitmap data structure associated with each record of a database table, in accordance with an embodiment of the invention.

FIG. 2 illustrates an exemplary representation of bitmap data structure associated with each record of a database table, in accordance with an embodiment of the invention.

Referring to FIG. 2, each record in the database table 110 is associated with a look-up table that stores field lock information of each field corresponding to the record. The record R1 is associated with a look-up table 202, the record R2 is associated with a look-up table 204, the record R3 is associated with a look-up table 206 and the record R4 is associated with a look-up table 208. A look-up table associated with a record includes lock information of each field to identify fields that are locked and unlocked corresponding to the record. For example, if a field is being updated by a user then the field is locked and its lock information is updated as locked in the look-up table.

In an embodiment, the look-up table is a bitmap data structure that includes a bit field corresponding to each field of the record. A bit field corresponding to a field includes a predefined bit value based on the lock information of the field. For example, if the field is being accessed and updated by a user, then a value '1' is set as the bit value in the corresponding bit field. Similarly, the bit fields corresponding to unlocked fields can have bit values as '0'. This will enable faster identification of locked and unlocked fields. In an embodiment, a look-up table can be associated with each field of the database table. The look-up table associated with the fields may include information regarding each record of the database table.

In the look-up table 202, a first bit field and a third bit field value are set as '1' and the remaining bit fields are set as '0' as the fields C1 and C3 in the record R1 are locked. In the look-up table 204 associated with the record R2, bit fields corresponding to the fields C2 and C3 are set as '1'. In the look-up table 206 associated with the record R3, bit fields corresponding to the fields C4 and C5 are set as '1'. Similarly, in the look-up table 208 associated with the record R4, bit fields corresponding to the fields C2 and C6 are set as '1'. Hence, the requests to update fields corresponding to each record are handled based on the lock information of each field stored in the look-up table associated with the each record.

In an example, requests to update fields C2 and C4 corresponding to the record R1 will be handled concurrently as the lock information corresponding to the fields C2 and C4 represents '0'. The fields C2 and C4 can be updated concurrently and thereafter the lock information corresponding to the fields can be updated. Hence, the bit value in the bit map data structure corresponding to the fields C2 and C4 will be set as '1' until the update operation is being performed to the fields C2 and C4. The field information is then updated and set to '0' when the update operation is completed. Similarly, the plurality of requests to update plurality of fields corresponding to a same record is handled.

Figure 3:
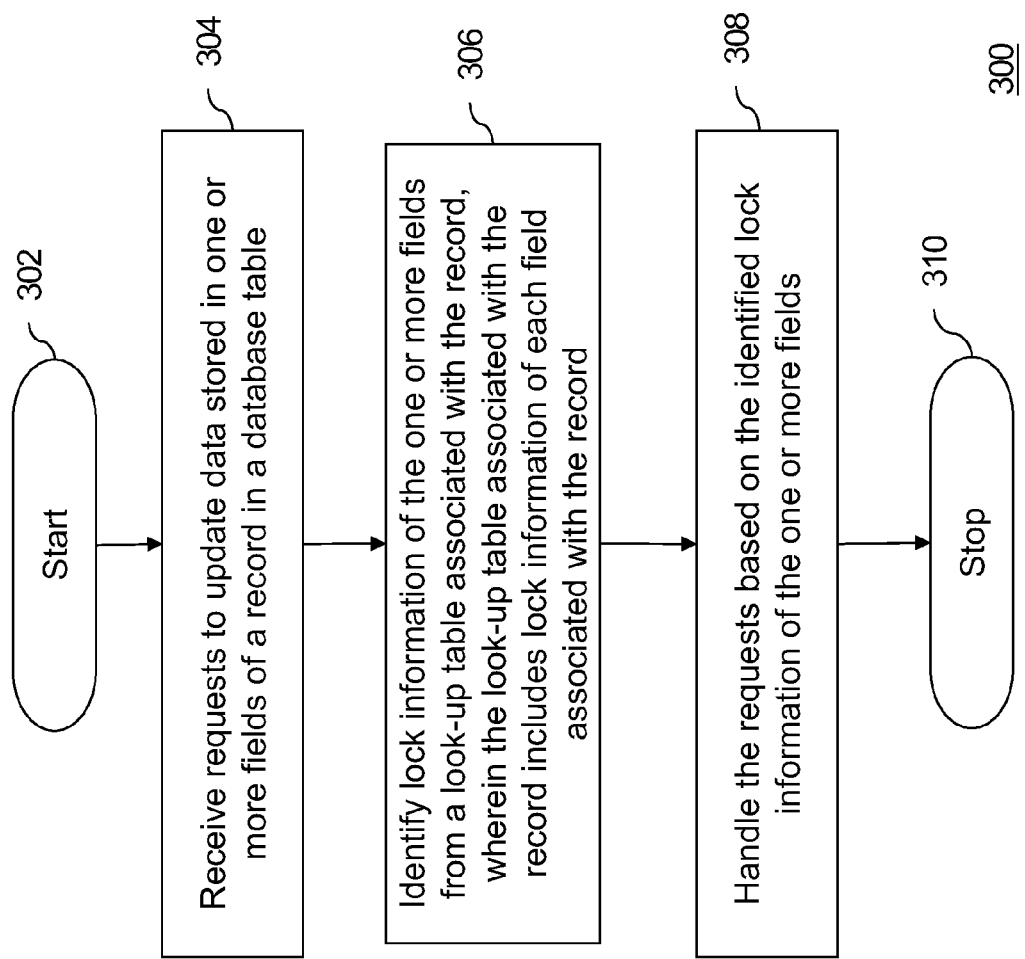
FIG. 3 illustrates a flowchart diagram representing a method for managing concurrent access to data in a database system, in accordance with an embodiment of the invention; and FIG. 4A

FIG. 3 illustrates a flowchart diagram representing a method for managing concurrent access to data in a database system, in accordance with an embodiment of the invention.

Referring to FIG. 3, the method 300 is initiated at step 302. At step 304, the method 300 receives requests to update data stored in the one or more fields of a record in a database table. For example, in the environment 100, the requests are received from the user 102, user 104 and user 106 to update fields of the record R1. The requests are then handled concurrently or non-concurrently (sequentially) based on lock information of the fields of the record R1. In an embodiment, lock information of each field of the record R1 is stored in a look-up table associated with the record R1.

At step 306, the method identifies lock information of the one or more fields from the look-up table associated with the record. For example, if a request is received from the user 102 to update the fields C1 and C2 of the record R1 then the lock information of the fields C1 and C2 is identified from the look-up table 202. Similarly, the method identifies the lock information of all the fields associated with the other requests.

At step 308, requests are handled based on the lock information of the one or more fields identified at step 306. In an embodiment, the requests are handled concurrently by the method. In the embodiment, the requests are handled concurrently when the fields associated with each of the request are dissimilar to each other and the fields associated with each request are unlocked. The unlocked fields are identified based on the lock information of the fields stored in the look-up table. Thus, the method performs update operation. In another embodiment, the requests are handled non-concurrently. In the embodiment, the requests are handled concurrently, when at least one field associated with one or more request is similar to each other and/or at least one field associated with one or more request are locked. The locked fields are identified based on the lock information of the fields stored in the look-up table. At step 310, the method 300 is terminated.

Figure 4A:
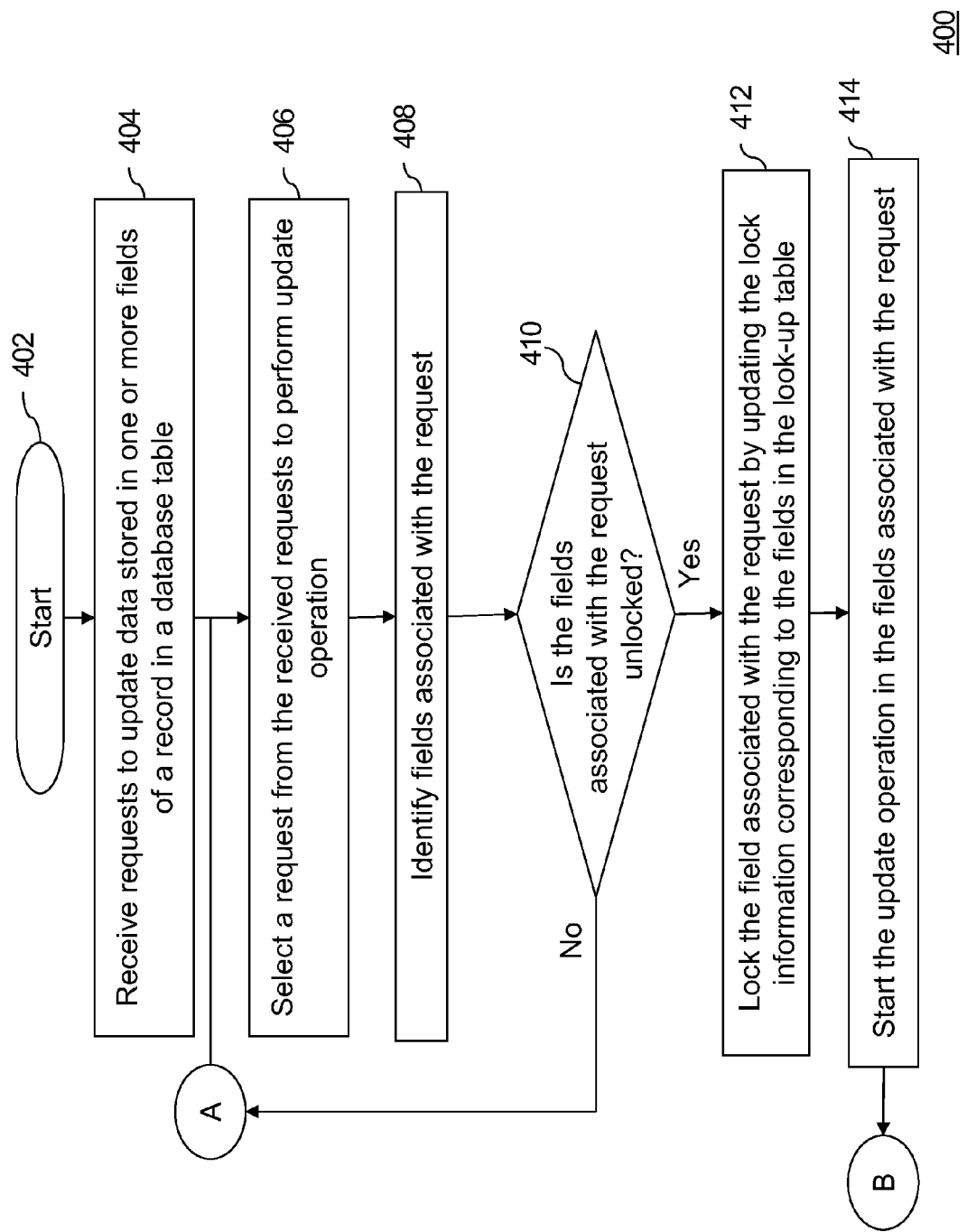
FIG. 4B illustrates a flowchart diagram representing a method for managing concurrent access to data in the database system, in accordance with another embodiment of the invention.
Figure 4B:
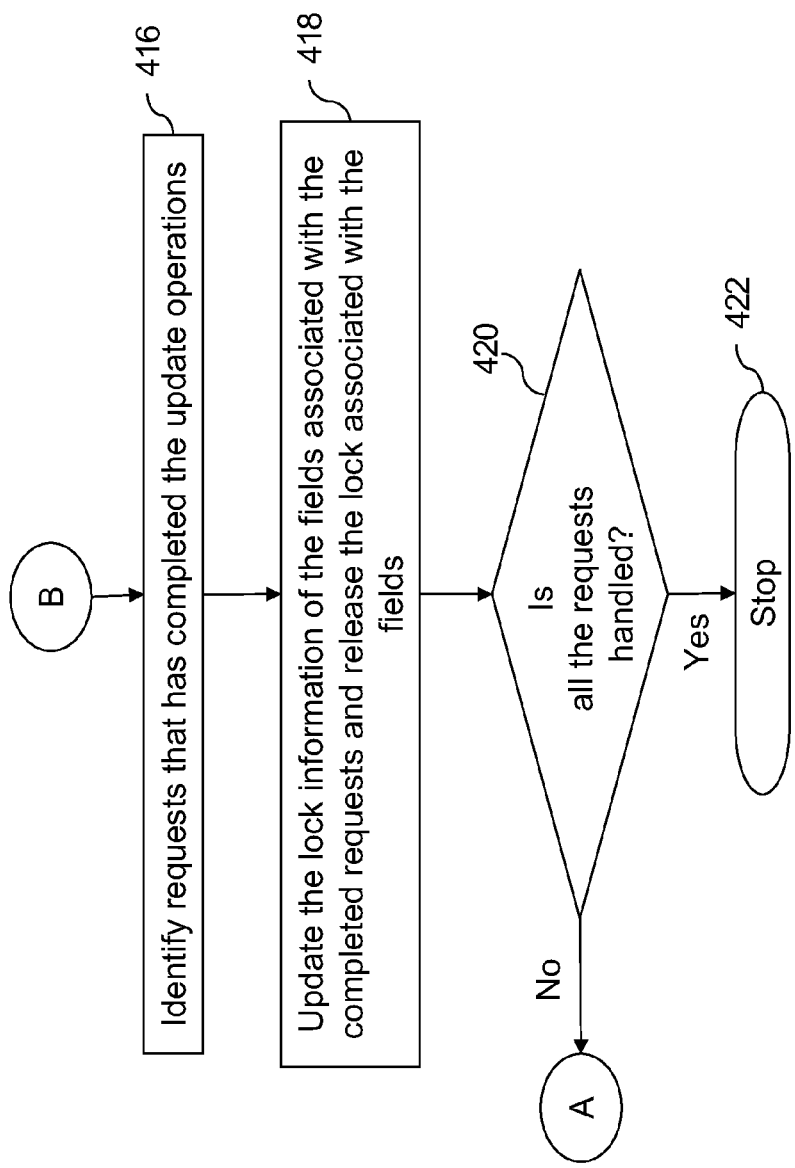

FIG. 4A and FIG. 4B illustrates a flowchart diagram representing a method for managing concurrent access to data in the database system, in accordance with another embodiment of the invention.

Referring to FIG. 4, the method 400 is initiated at step 402. At step 404, one or more requests are received from the users to update one or more fields of a record in a database table. At step 406, a request is selected from the one or more received requests to perform update operation. At step 408, fields associated with the selected request are identified. At step 410, the lock information of the fields associated with the request is analyzed and checked if the fields associated with the request are locked or unlocked. In an embodiment, the lock information is stored in a look-up table associated with the record. In an embodiment, the look-up table is a bit map data structure that includes bits corresponding to each field of the record. The bit values in the bitmap data structure represent a locked field or an unlocked field.

At step 410, if the method determines that the fields associated with the request are unlocked, then step 412 is performed, otherwise, step 406 is again performed. At step 412, the request received from the user 102 is being handled and the field associated with the request is locked by updating the lock information in the look-up table. In an embodiment, the method will wait until the locks of the fields, associated with the request, are released and then perform the step 412. At step 414, the update operation in the fields associated with the request is started. At step 416, the method tracks the update operations and identifies the requests that have completed the update operations.

At step 418, the lock information of the fields associated with the completed requests is updated and a lock corresponding to the fields is released. At step 420, the method checks if all the requests are handled or not. The method performs the step 406 if all the received requests are not handled, otherwise, step 422 is performed. At step 406, the method selects another request received and performs the same method mentioned above. This method is performed until the entire received requests are handled. At step 422, the method 400 is terminated. For the sake of clarity and for the purpose of this description, the above method is explained with the help of the following example. The example is solely for the purpose of clarification and no where limits the scope of the invention to the following.

In the example, it is assumed that all the fields corresponding to each record are initially unlocked. The field lock information is included in a bit map data structures (look-up tables) associated with each record. Hence, lock information of each field stored in a look-up table (202) associated with a record (the record R1) represents bit value as '0'.

In the example, one or more requests are received from the user 102, 104, and 106 to update one or more fields of record R1 in the database table 110. In the one or more requests, a request is received from the user 102 to update fields C1 and C3, a request is received from the user 104 to update fields C2 and C4 and a request is received from the user 106 to update fields C3 and C4.

For handling the received requests, the method first selects the request received from the user 102. Thereafter, the method identifies the fields C1 and C3 associated with the request received from the user 102. The lock information of the fields C1 and C3 is then identified from the lock information stored in the look-up table associated with the record R1. The method then checks if the fields C1 and C3 are locked or unlocked based on the lock information. Hence, as the lock information corresponding to the fields C1 and C3 is marked as unlocked, and the update operation is performed on the field C1 and C3. The lock information corresponding to the fields C1 and C3 is then updated in the look-up table and the lock information corresponding to the fields C1 and C3 is represented as locked. The method then starts update operation on the fields C1 and C3.

Thereafter, the method identifies the fields (C2 and C4) associated with the request, received from the user 104. The lock information of the fields C2 and C4 is identified from the lock information stored in the look-up table associated with the record R1. The fields C2 and C4 are then updated as the fields are unlocked. The method then performs concurrent updates on the fields C2 and C4, along with the updates of the field C1 and C3 and will further update the lock information of the fields C2 and C4 as locked. The method will also check if update operation associated with a request is completed. The lock information of the fields associated with the completed request is updated and marked as unlocked, if the update operation associated with the request is completed.

Thereafter, the method checks if all the requests has been handled or not. Hence, as the requests from the user 104 and 106 is not handled, the method identifies the fields (C3 and C4) associated with the request received from the user 106. Thereafter, lock information of the fields C3 and C4 is identified from the lock information stored in the look-up table associated with the record R1. The fields C3 and C4 are then identified as locked based on the lock information of the field corresponding to the fields C3 and C4. The update operation is then held back and the method will wait for the other users to release the lock and update lock information of the fields in the look-up table corresponding to the fields C3 and C4. When the fields C3 and C4 are unlocked, the request from the user 106 is handled and the update operation is performed on the fields C3 and C4. Hence, in the example, the update request received from the user 102 and the user 104 are handled concurrently and the request received from the user 106 is handled non-concurrently or sequentially.

Various embodiments of the present invention described above may provide at least, but are not limited to, the following advantages. The present invention provides a method for managing concurrent access to data in a database system. The method concurrently handles multiple requests to update the data stored in multiple fields of a single record in a database table. The method increases the efficiency of the database system by providing granular lock mechanism. The method provides an efficient and faster way to identify field lock information of the database table. Thus, decreasing the response time of the queries and the operations performed on the database table.

As will be appreciated by one skilled in the art, aspects of the present invention may be embodied as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer implemented method for managing access to data in a database system, the method comprising:

receiving requests to update data stored in one or more fields of a record in a database table;

identifying lock information of the one or more fields of the record from a look-up table associated with the record, wherein the look-up table associated with the record includes lock information of each field of the record and the record includes at least one locked field and at least one unlocked field, wherein the look-up table comprises a bitmap data structure including bit values corresponding to fields of the record, and wherein a bit value corresponding to a field represents lock information of the corresponding field; and handling the requests to update data based on the identified lock information of the one or more fields.

2. The method of claim 1, wherein the record is a row of the database table.

3. The method of claim 1, wherein the one or more fields comprises two or more fields, and wherein the step of identifying comprises identifying locked fields and unlocked fields of a single record in the two or more fields.

4. The method of claim 1, wherein the step of handling comprises updating the data stored in the one or more fields based on the lock information of the one or more fields stored in the look-up table.

5. The method of claim 1 further comprising concurrently handling the requests based on fields associated with each request and the identified lock information of the one or more fields.

6. The method of claim 1 further comprising sequentially handling the requests based on fields associated with each request and the identified lock information of the one or more fields.

7. The method of claim 1, wherein the step of handling comprises updating the lock information of the one or more fields in the look-up table.

8. A computer system including at least one processor configured to:

receive requests to update data stored in one or more fields of a record in a database table;

identify lock information of the one or more fields of the record from a look-up table associated with the record, wherein the look-up table associated with the record includes lock information of each field of the record and the record includes at least one locked field and at least one unlocked field, wherein the look-up table comprises a bitmap data structure including bit values corresponding to each field of the record, and wherein a bit value corresponding to a field represents lock information of the field; and handle the requests to update data based on the identified lock information of the one or more fields.

9. The system of claim 8, wherein the one or more fields comprises two or more fields, and wherein the processor is further configured to identify locked fields and unlocked fields of a single record in the two or more fields.

10. The system of claim 8, wherein the processor is further configured to update the data stored in the one or more fields based on the lock information of the one or more fields stored in the look-up table.

11. The system of claim 8, wherein the processor is further configured to concurrently handle the requests based on fields associated with each request and the identified lock information of the one or more fields.

12. The system of claim 8, wherein the processor is further configured to sequentially handle the requests based on fields associated with each request and the identified lock information of the one or more fields.

13. The system of claim 8, wherein the processor is further configured to update the lock information of the one or more fields in the look-up table.

14. A computer program product comprising a non-transitory computer readable storage medium having computer readable program code embodied therewith, the computer readable program code configured to:
   receive requests to update data stored in one or more fields of a record in a database table;
   identify lock information of the one or more fields of the record from a look-up table associated with the record, wherein the look-up table associated with the record includes lock information of each field of the record and the record includes at least one locked field and at least one unlocked field, wherein the look-up table comprises a bitmap data structure including bit values corresponding to each field of the record, and wherein a bit value corresponding to a field represents lock information of the field; and
   handle the requests to update data based on the identified lock information of the one or more fields.

15. The computer program product of claim 14, wherein the lock information identifies locked fields and unlocked fields in the one or more fields.

16. The computer program product of claim 14, wherein the computer readable program code is further configured to concurrently handle the requests based on fields associated with each request and the identified lock information of the one or more fields.

17. The computer program product of claim 14, wherein the computer readable program code is further configured to sequentially handle the requests based on fields associated with each request and the identified lock information of the one or more fields.

18. The computer program product of claim 14, wherein the one or more fields comprises two or more fields, and wherein the step of handling comprises updating the lock information of the two or more fields of a single record in the look-up table.

* * * * *